No. 812,786. PATENTED FEB. 13, 1906.
C. ELLIS.
HEAT RECUPERATOR FOR CEMENT KILNS.
APPLICATION FILED AUG. 11, 1905.
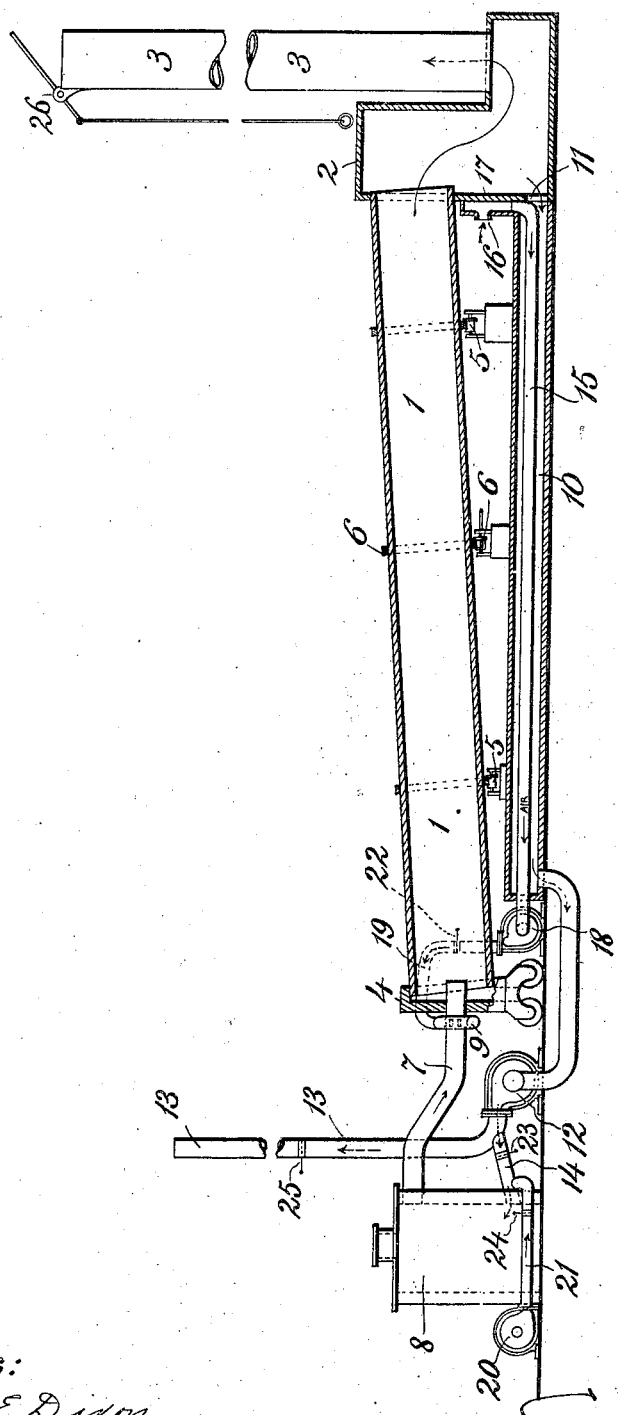
Witnesses:
Warren E. Dixon.
Henry D. Smith.
Inventor:
Carleton Ellis

UNITED STATES PATENT OFFICE.

CARLETON ELLIS, OF NEW YORK, N. Y., ASSIGNOR TO COMBUSTION UTILITIES COMPANY, OF NEW YORK, N. Y., A CORPORATION OF NEW YORK.

HEAT-RECUPERATOR FOR CEMENT-KILNS.

No. 812,786.     Specification of Letters Patent.     Patented Feb. 13, 1906.

Original application filed April 18, 1905, Serial No. 256,246. Divided and this application filed August 11, 1905. Serial No. 273,845.

*To all whom it may concern:*

Be it known that I, CARLETON ELLIS, a citizen of the United States, and a resident of New York city, in the county of New York and State of New York, have invented certain new and useful Improvements in Heat-Recuperators for Cement-Kilns, of which the following is a specification.

This invention relates to apparatus for the continuous regeneration or recuperation of a portion of the sensible heat which is now lost at the stack in the manufacture of Portland-cement clinker by the rotary-kiln process. As is well known, the gases leaving the upper part of the rotary kiln are at a high temperature and carry in the form of sensible heat a large portion of the heat generated by the fuel.

It is the object of this invention to recover a large portion of the heat ordinarily lost in this manner by means of recuperative devices of such a character that they need not be introduced into or form a part of the housing of the kiln, but unlike such apparatus are so constructed as to have no retarding influence upon the draft of the kiln.

In the accompanying diagrammatic drawing a form of continuous recuperator is shown which I now regard as the best of the various forms in which this invention may be embodied. The drawing illustrates in section a rotary kiln with a heat-recuperator and other accessories.

Referring to the drawing, 1 is a rotary kiln having the housing 2, stack 3, the header 4, rollers 5, and rotating mechanism 6.

7 is a pipe delivering fuel to the kiln. In the present instance it is shown connected to a gas-producer 8, the fuel used for burning the cement, as illustrated, being producer-gas.

9 is a bustle-pipe surrounding the pipe 7 and housing for the admission of air to support combustion, although the admission of air is not necessarily confined to this point and air may be admitted through the clinker-discharge opening or otherwise.

10 is a passage having inlet 11 into the housing of the kiln. Through this passage the intensely-heated products of combustion are drawn by means of the fan 12. In this passage is placed the pipe or flue 15, in which is an air-inlet 16 near the upper end of the kiln. A fan 18 serves to draw air through the passage 15 and propel it through the passage 19 into the kiln.

13 is an exhaust-pipe for the fan 12.

14 is a pipe extending from the fan to the gas-producer, so arranged that products of combustion and air may be admitted to the producer to generate combustible gas.

The fan 20 delivers fresh air to the pipe 14 through the pipe 21. Dampers or valves 22, 23, 24, and 25 serve to regulate the flow of the gases or air employed in the operation of this apparatus.

My method of operation of the illustrated apparatus is as follows: Products of combustion from the kiln 1 pass into the housing 2, heating the latter to a high temperature, and ordinarily depart through the stack 3. A portion of the products of combustion or all portion of the stack-gas, if desired, may be drawn through the aperture 11 into the recuperator 10 by means of the fan 12. At the same time air is drawn through the inlet 16 into the flue 15. As it traverses the horizontal portion of the flue 15 it becomes highly heated. It is then delivered to the kiln in such amount as is necessary to effect complete and intense combustion. The products of combustion traverse the passage 10 and are cooled by the air passing through 15 and may be taken by the fan 12 without injury and delivered to the producer 8 in such amount as may be needed for the operation of gas-making, it being understood that sufficient carbon dioxid is used to control the temperature of the producer and prevent the slagging or cindering of the fuel. Steam, of course, may be used for the same purpose, although it is not as desirable. The fan 20 permits of the introduction of fresh air in sufficient amount to form a blast mixture of the requisite composition. Such quantities of the products of combustion as are not needed in the producer are discharged through the pipe 13. By regulating the various dampers above mentioned the flow of gases and the control of combustion in the kiln and in the producer may be properly made. The air may be forced through the recuperator by placing the fan at the opposite end. In that way the fan may handle cool air and is less liable to injury than when situated where heated air is handled. The flow of gases from kiln 1 through housing 2 to stack 3 being in one direction, while that from the housing to and through the auxiliary flue is in a contrary direction, there is an intermediate neutral or quieting zone between the two flows where dust tends to deposit.

What I claim is—

1. In a cement-making apparatus, the combination of a kiln, a fuel-burner for one end of the kiln, a dust-collecting housing for the other end of the kiln, a chimney-stack connected to and removing waste gases from the housing, an auxiliary flue also connected to the housing and abstracting a portion of waste gases therefrom and delivering the same adjacent the other end of the kiln, a surface air-heater contained in the auxiliary flue and delivering heated air to the fuel-burner, and power-driven means for inducing and controlling the flow of the abstracted waste gases through said flue in a direction contrary to the direction of the normal flow of the main body of waste gases through the housing and stack, whereby a quieting and dust-settling zone is created between the two lines of flow.

2. In a cement-making apparatus, a gas-fired kiln, a gas-producer supplying gas thereto, a housing for the upper end of the kiln, a chimney-stack removing waste gases from the housing, an auxiliary flue also connected to the housing for abstracting a portion of waste gases therefrom, a surface air-heater contained in the flue, power-driven means for inducing and controlling a flow of waste gases through the flue and thereby regulating the heating of the air, a pipe connection from the heater delivering heated air into the gas-fired end of the kiln, and a pipe connection delivering cooled waste gases from the flue into the gas-producer.

3. In a cement-making apparatus, an inclined rotary gas-fired kiln, a gas-producer supplying gas to the kiln, a dust-collecting housing for the upper end of the kiln, a chimney-stack removing waste gases from the housing, an auxiliary flue also connected to the housing for abstracting a portion of the waste gases therefrom, a surface air-heater contained in the flue, power-driven means for inducing and controlling a flow of waste gases through the flue and thereby regulating the heating of the air, a pipe connection between the heater and the gas-burner of the kiln, and a pipe connection abstracting a portion of the cooled waste gases from the flue and delivering the same into the gas-producer.

Signed at New York city, in the county of New York and State of New York, this 22d day of June, A. D. 1905.

CARLETON ELLIS.

Witnesses:
 JAS. K. CLARK,
 A. M. SENIOR.